US009519355B2

(12) United States Patent
Devries

(10) Patent No.: US 9,519,355 B2
(45) Date of Patent: Dec. 13, 2016

(54) MOBILE DEVICE EVENT CONTROL WITH DIGITAL IMAGES

(71) Applicant: Derek A Devries, San Francisco, CA (US)

(72) Inventor: Derek A Devries, San Francisco, CA (US)

( * ) Notice: Subject to any disclaimer, the term of this patent is extended or adjusted under 35 U.S.C. 154(b) by 329 days.

(21) Appl. No.: 13/840,120

(22) Filed: Mar. 15, 2013

(65) Prior Publication Data

US 2014/0267011 A1    Sep. 18, 2014

(51) Int. Cl.
G06F 3/03 (2006.01)
G06F 3/01 (2006.01)
G06F 3/033 (2013.01)
G06F 3/048 (2013.01)

(52) U.S. Cl.
CPC ............ *G06F 3/0304* (2013.01); *G06F 3/017* (2013.01); *G06F 3/033* (2013.01); *G06F 3/048* (2013.01)

(58) Field of Classification Search
CPC ...... G06F 3/017; G06F 3/0425; G06F 3/0304; G06F 3/033; G06F 3/048
See application file for complete search history.

(56) References Cited

U.S. PATENT DOCUMENTS

| | | | |
|---|---|---|---|
| 7,599,561 B2* | 10/2009 | Wilson et al. ................ 382/199 |
| 8,347,213 B2* | 1/2013 | Clifton et al. ................ 715/730 |
| 8,718,383 B2* | 5/2014 | Valencia-Campo ............. G06F 17/30256 382/181 |
| 8,913,037 B1* | 12/2014 | Liu et al. ...................... 345/175 |
| 2002/0036642 A1* | 3/2002 | Kwon et al. .................. 345/531 |
| 2003/0182210 A1* | 9/2003 | Weitzman et al. ............. 705/27 |
| 2006/0002607 A1* | 1/2006 | Boncyk ............ G06F 17/30247 382/165 |
| 2006/0136846 A1* | 6/2006 | Im et al. ........................ 715/863 |
| 2009/0013036 A1* | 1/2009 | Kim et al. .................... 709/203 |
| 2009/0167682 A1* | 7/2009 | Yamashita ............. G01C 21/36 345/158 |
| 2010/0079413 A1* | 4/2010 | Kawashima et al. ......... 345/175 |
| 2010/0234077 A1* | 9/2010 | Yoo et al. ..................... 455/566 |
| 2012/0119987 A1* | 5/2012 | Im ............................ G06F 3/017 345/156 |
| 2012/0127197 A1* | 5/2012 | Sakayori ............... G06F 3/0346 345/619 |
| 2012/0296897 A1* | 11/2012 | Xin-Jing ............ G06F 17/30265 707/728 |
| 2013/0050125 A1* | 2/2013 | Sudo ............................ 345/173 |
| 2013/0069893 A1* | 3/2013 | Brinda et al. ................ 345/173 |
| 2015/0078617 A1* | 3/2015 | Hong et al. .................. 382/103 |

* cited by examiner

*Primary Examiner* — Kumar Patel
*Assistant Examiner* — Sejoon Ahn

(57) ABSTRACT

In one exemplary embodiment, a method includes receiving a digital image from a mobile device. A first element of the digital image and a second element of the digital image is identified. The first element of the digital image includes a user-selected content. The second element includes a depiction of a user action. An event trigger identified by the first element and the second element is determined. The event trigger includes a mobile device operating system command. A mobile device command is generated according to the event trigger. The mobile device command is communicated to a mobile operating system.

3 Claims, 10 Drawing Sheets

MOBILE DEVICE EVENT CONTROL WITH DIGITAL IMAGES

BACKGROUND

1. Field

This application relates generally to mobile devices, and more particularly to a system, method and article of manufacture of mobile device event control with digital images.

2. Related Art

Mobile devices may have several user input options. For example, a mobile device can include a touchscreen that the user can control through simple and/or multi-touch gestures by touching the screen with one or more fingers. However, touchscreen size can impede the number and/or size of control elements (e.g. application virtual button, virtual keyboards, etc.). These limitations may be frustrating for a user and/or slow user input operations.

BRIEF SUMMARY OF THE INVENTION

In one aspect, a method includes receiving a digital image from a mobile device. A first element of the digital image and a second element of the digital image are identified. The first element of the digital image includes a user-selected content. The second element includes a depiction of a user action. An event trigger identified by the first element and the second element is determined. The event trigger includes a mobile device operating system command. A mobile device command is generated according to the event trigger. The mobile device command is communicated to a mobile operating system.

Optionally, the user-selected content can include a user-drawn text and geometric shape. The user-drawn text and geometric shape indicate the operating system command. The mobile device operating system command can include a command to execute an image search with an online image search engine accessed by a web browser operating in the mobile device.

BRIEF DESCRIPTION OF THE DRAWINGS

The present application can be best understood by reference to the following description taken in conjunction with the accompanying figures, in which like parts may be referred to by like numerals.

Figure 1:
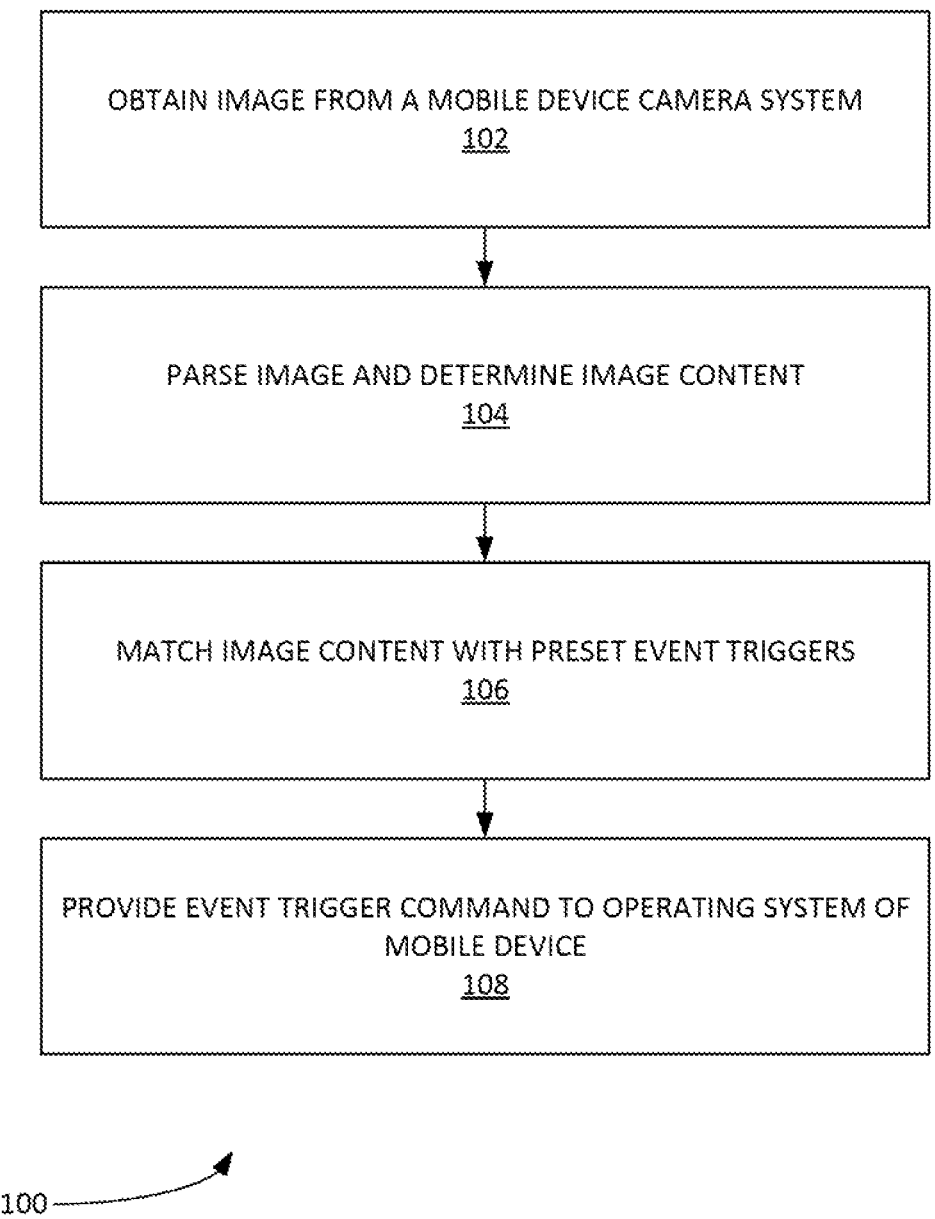
FIG. 1 depicts an example process of mobile device event control with digital images, according to some embodiments

The Figures described above are a representative set, and are not an exhaustive with respect to embodying the invention.

DESCRIPTION

Disclosed are a system, method, and article of manufacture of mobile device event control with digital images. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Process Overview

FIG. 1 depicts an example process 100 of mobile device event control with digital images, according to some embodiments. The event can include various mobile device processes such as application process, operating system process and the like. A digital image can include an event trigger.

An event trigger can be pre-set by a user and/or preexisting in an application that performs process 100. For example, a user can use a client application with a user interface on the mobile device's display to load/identify various image elements and associated event triggers. For example, a user can take a picture of a hand written word/phrase/image such as 'open web browser'. The digital image can be associated with an event trigger such as a command to open a mobile device's web browser functionality and/or access a specific file or dataset.

In step 102 of process 100, a digital image can be obtained from a digital camera system in a mobile device. The digital image can be a single image, a digital video stream and/or digital images periodically samples form a video stream. In some embodiments, a client application can obtain the digital images and upload to a server application. In other examples, the client-side application can perform process 100 and run in the mobile device (e.g. using downloadable image recognition application, etc.).

In step 104, the image is parsed. For example, various elements of the image can be identified and separated for analysis. Each element can be identified using various computer vision techniques. For example, one or several pre-specified or learned objects or object classes can be recognized (e.g. with an object recognition functionality such as Google Goggles®). Object recognition algorithms can include, inter alia: appearance-based methods, feature-based methods, recognition by parts, etc. In this way, various objects in the digital image can be identified.

In step 106, the identified image element(s) are matched with preset event triggers (e.g. with a table, index, etc.). It is noted that an event trigger can include more than one image/video/audio element in order to be activated. For example, an image of the letters 'off' written on a white sheet of paper can be obtained. Alone, this may not trigger an associated event. However, if the image includes a circle around the letters and/or a portion of a human finger touching a circle's radius, then the event trigger to turn off the mobile device can be triggered. In another example, the digital image of the letter 'off' can be obtained from a video. The audio stream of the video can be analyzed (e.g. with voice-to-text functionalities) and a human voice can be detected that says "mobile device" substantially simultaneously an image of a human finger entering the radius of a circle around the letters. These events within a specified time frame can form the triggers to initiate a turn off the mobile device command.

In step 108, an event command is provided to the operating system of the mobile device when the event trigger is detected. It is noted that process 100 can be implemented with a mobile-device application, a client-server application system and/or a combination of both (e.g. certain digital image, video and/or audio recognition functions can be performed on a server while event triggers can be handled client-side, etc.). In some embodiments, in the event a server-side functionality is implemented in a server, any queries and/or other uploaded information can include metadata that identifies such information as the mobile device's operating system, location, cellular network, etc. In this way, a server can provide an appropriate event command to the mobile device's operating system.

Process 100 can run in the background and obtain digital images from the mobile devices camera system and/or audio from the mobile device's microphone system without a user opening a specialized application. Process 100 can be triggered by certain key events such as the opening of a mobile device's camera/video application, the detection of a spoken keyword by a user, the detection of a specified user biometric identifier (e.g. with voice recognition functionalities and/or other biometric identifiers), user input cues (e.g. moving the mobile device in at a certain spatial orientation in a certain pattern) and/or the like. In some embodiments, the systems of FIGS. 4-7 can be utilized to perform process 100.

Figure 2:
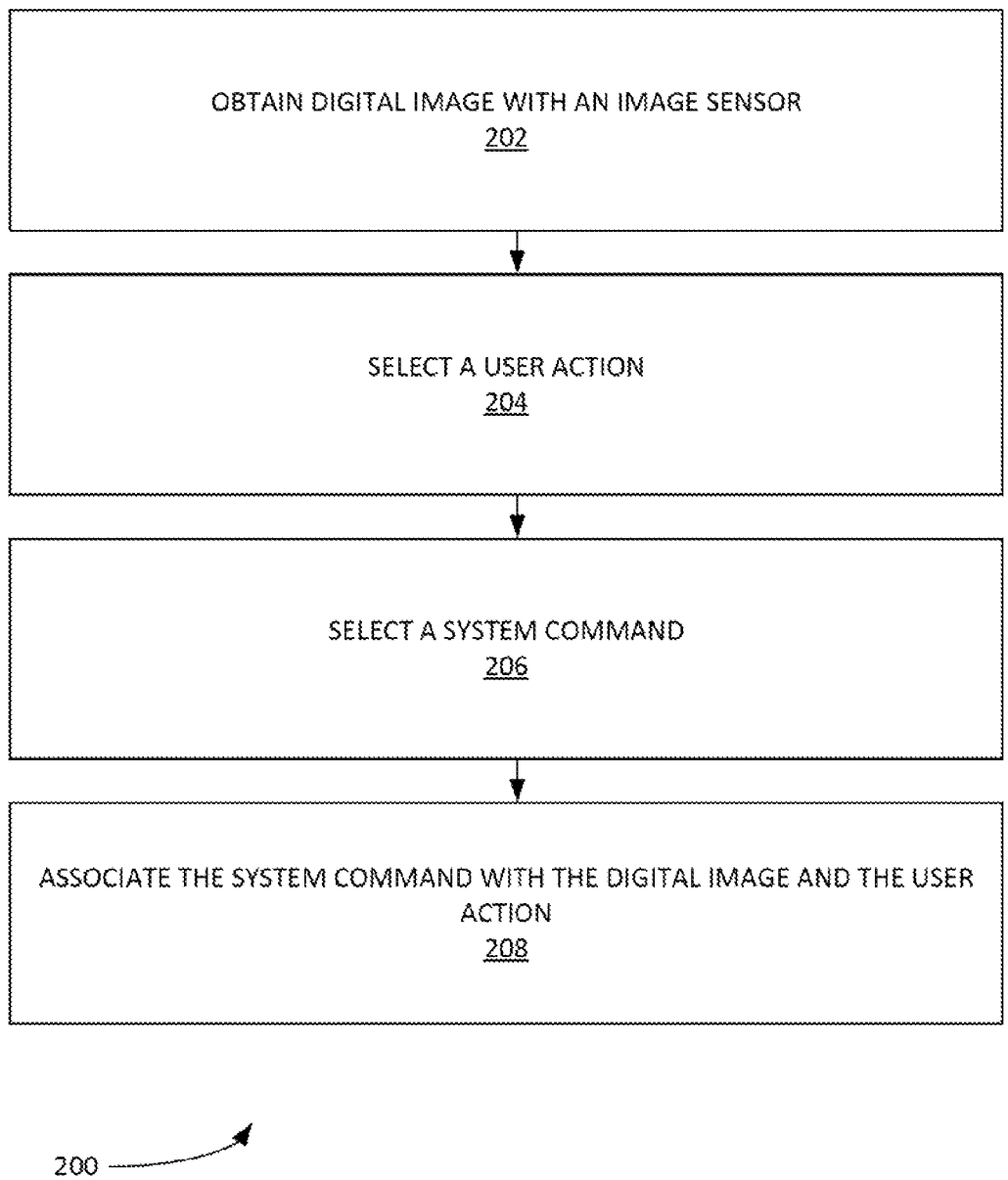
FIG. 2 depicts an example process of pre-specifying objects and/or object classes that can be recognized as event triggers, according to some embodiments.

FIG. 2 depicts an example process 200 of pre-specifying objects and/or object classes that can be recognized as event triggers, according to some embodiments. In step 202 of process 200, a digital image is obtained with a mobile device's image sensor. The physical content of the digital image can be created by the user. In one example, the content can be a set of text within geometric boundaries shaped to indicate a functionality of the content (e.g. as a command button to open an application whose file name includes the text, a square boundary can be preset to indicate a web search for the text within the square, etc.). In some embodiments, the content can include colors, voice input, other audio input in addition to and/or in lieu of the digital image. In step 204, a user action is selected. For example, a user action can be video of a finger touching within the geometric boundary and/or overlapping a portion of the text. In another example, it can be user shaking the mobile device while computer an image of the text. Other embodiments are not limited by these examples. In step 206, a system command is selected. The system command can be any operating system command available to the user. The dashboard can present a scrolling graphical user interface (GUI) element with a list of available commands. In step 208, the command is associated with the digital image, the user action and the command. In this way, the set formed in 208 can be referenced when the user later uploads (e.g. via a client-side application) a digital image and other concomitant mobile device data to the server. Process 200 can be performed with sensors (e.g. an image sensor) native to the mobile device. These can be uploaded to a server (e.g. via a web page and/or client-side application with a dashboard view). In some embodiments, the systems of FIGS. 4-7 can be utilized to perform process 200.

Figure 3:
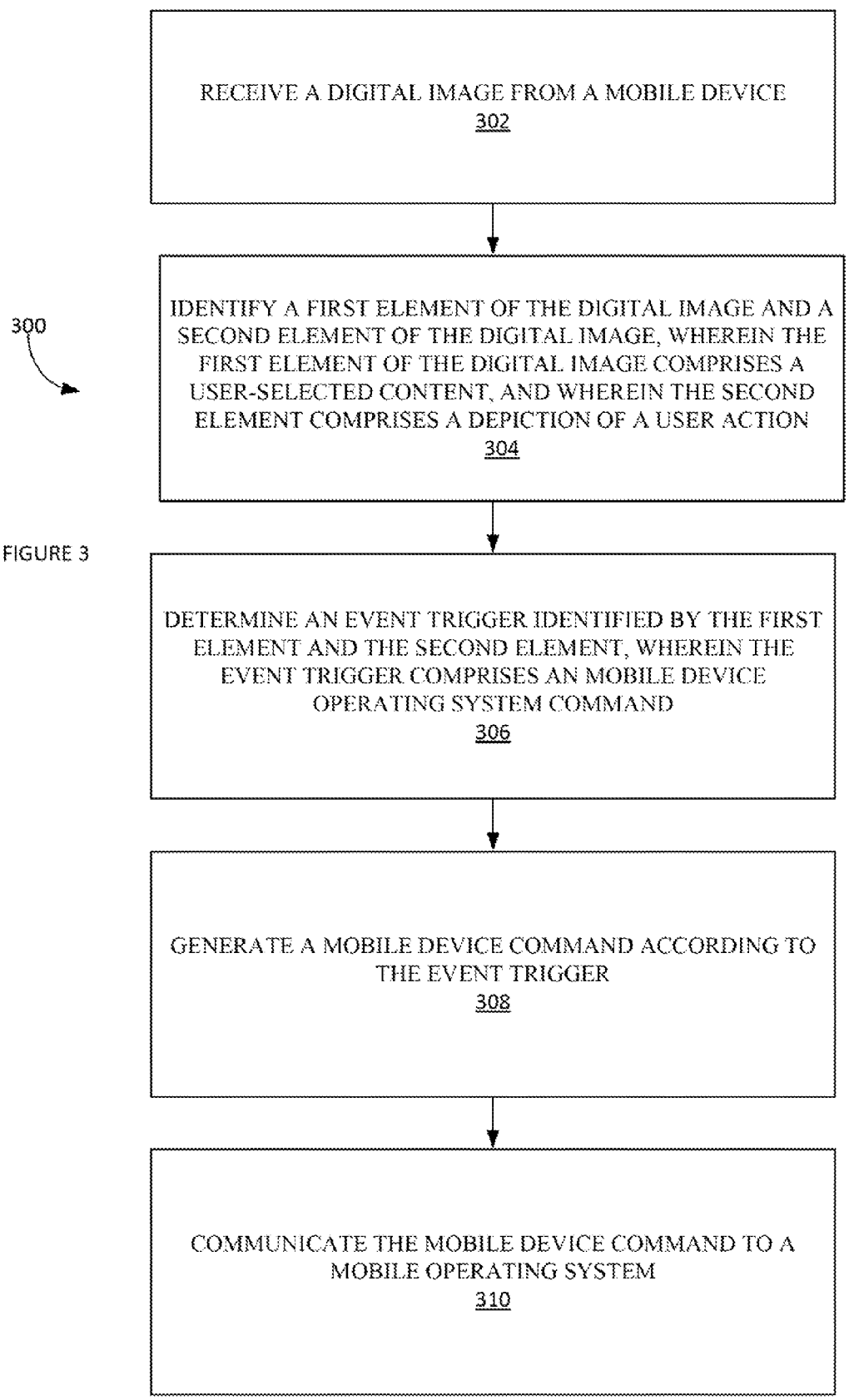
FIG. 3 depicts an example process of mobile device command input via user-generated images and user actions, according to some embodiments

FIG. 3 depicts an example process 300 of mobile device command input via user-generated images and user actions, according to some embodiments. In step 302, a digital image is received from a mobile device. The digital image can include a user-generated image (e.g. a collage of images created by user with a graphics editing program, a digital image manipulated by the user with a graphics editing program, a digital photograph of a hand-drawn image, a digital photograph of a publication image and/or any combination thereof). In step 304, a first element of the digital image and a second element of the digital image are identified. The first element of the digital image can include a user-selected content (see supra). The second element can include a depiction of a user action (e.g. the image includes the user 'flicking' an edge of the image, touch a region in the image, etc.). In step 306, an event trigger identified by the first element and the second element can be determined. The event trigger can include a mobile device operating system command. In step 308, a mobile device command is generated according to the event trigger. In step 310, the mobile device command is communicated to a mobile operating system. In some embodiments, the systems of FIGS. 4-7 can be utilized to perform process 300.

Exemplary Environment and Architecture

Figure 4:
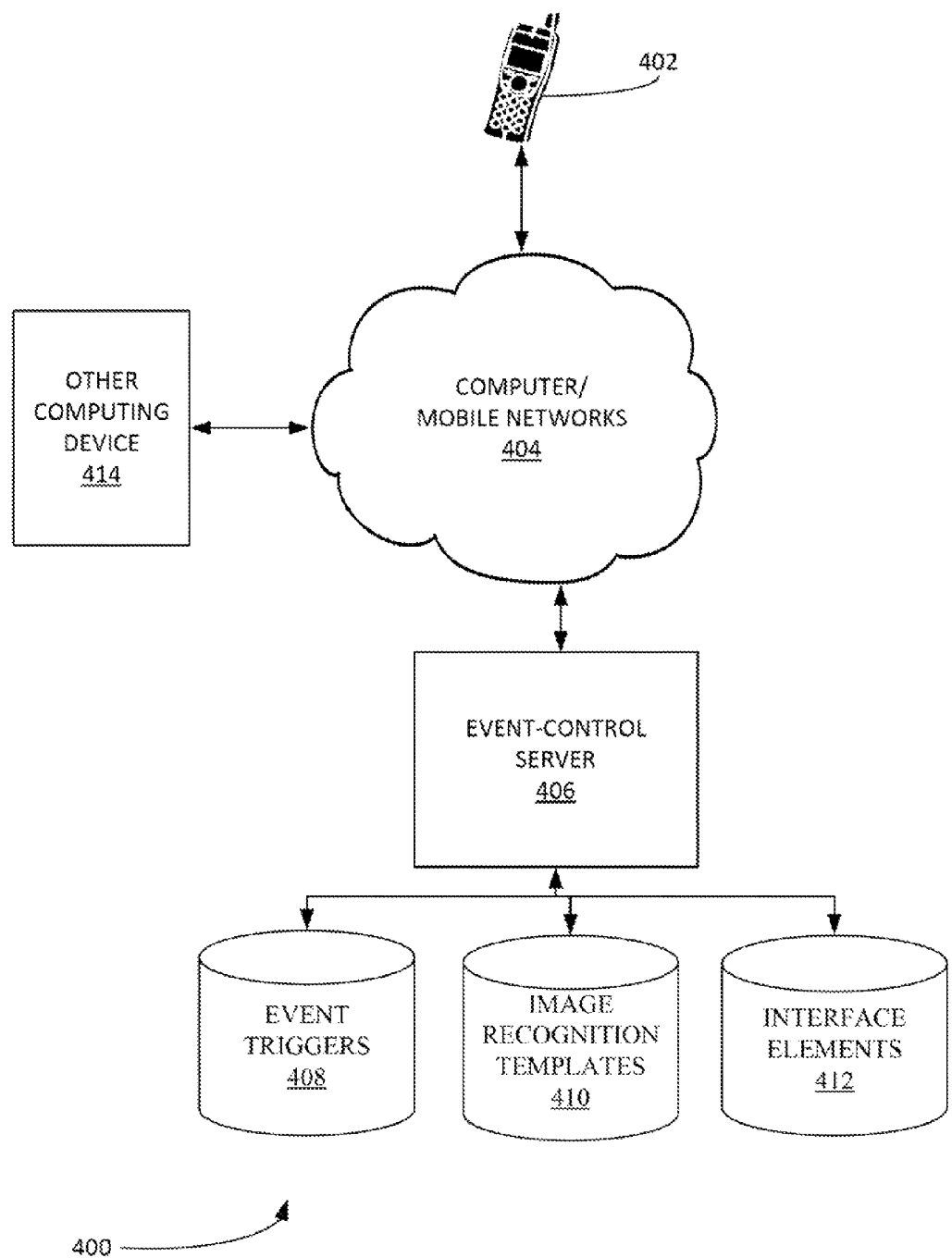
FIG. 4 illustrates an example system for implementing mobile device event control with digital images, according to some embodiments.

FIG. 4 illustrates an example system 400 for implementing mobile device event control with digital images, according to some embodiments. A mobile device 402 can include various sensor systems such as a digital camera, microphones, and the like. Mobile device 402 can obtain digital images, digital videos, audio data, and/or other sensor data. An event control process operating in mobile device 402 can communicate the data to event-control server 406 (e.g. via various computer and/or cellular data networks such as computer/mobile network(s) 404).

Event-control server 406 can receive the data from mobile device 402. Event-control server 406 can parse and analysis (e.g. see FIG. 5 infra for examples). Event-control server 406 can determine a mobile device command to be associated with one or more elements of the digital image (and/or additional image sensor or other sensor data uploaded to event-control server 406). In this way, digital images with multiple elements can include multiple commands to be executed by the mobile device. In another example, a user can input multiple commands in video and/or audio form as well.

Event-control server 406 can include a web server that provides a user's web browser web pages. These web pages can provide the user a dashboard for uploading various one or several pre-specified or learned objects or object classes that can be recognized as event triggers. For example, the user can upload a video of a soda can shaking. This video can be associated by the user with the command to open the text messaging application. In another example, the user can write the name 'Tom' on a white sheet of paper. The user can record the word 'dial' in an audio file. These files can be uploaded to event-control server via the web page dashboard and associated with a command to open the mobile device's mobile phone application can dial a number for the user's contact 'Tom' when event-control server 406 later receives a digital image of the name 'Tom' on a white sheet of paper and an audio file with at least the spoken word 'dial'. Various databases can be utilized to store information related to the processes performed by event-control server 406 such as event triggers 408, image-recognition templates 410 and/or interface elements 412. In some embodiments, system 400 can perform various event-control based on digital image content processes such as processes 100, 200 and/or 300.

Figure 5:
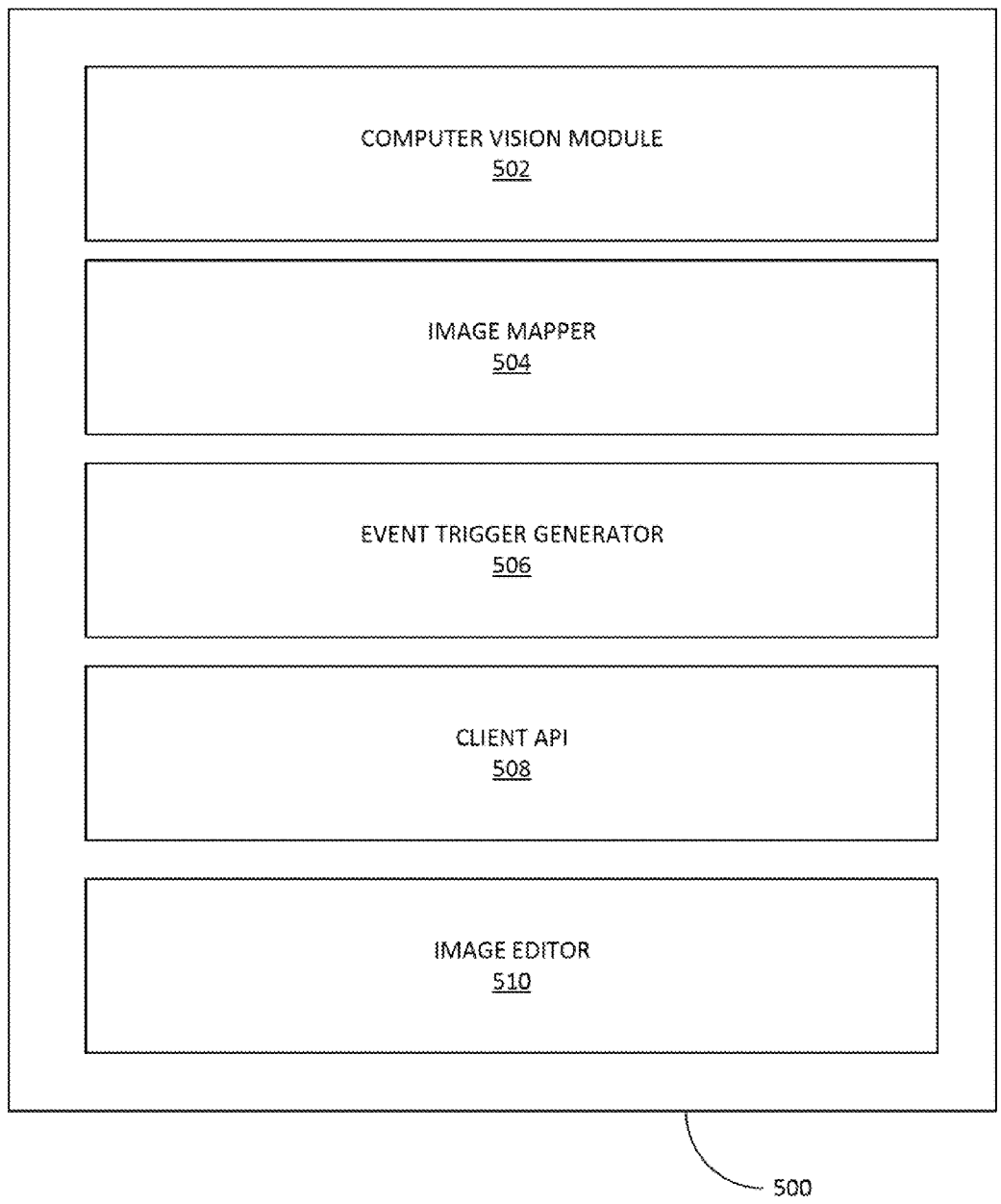
FIG. 5 illustrates an example event-control server, according to some embodiments.

FIG. 5 illustrates an example event-control server 500, according to some embodiments. In some embodiments event-control server 500 can receive sensors data from one or more client applications operating in various mobile devices. Event-control server 500 can parse the sensor into various elements and interpret sensor elements as event control input (e.g. by matching sensor elements with preset trigger events). Event-control server 500 can then generate and format an appropriate event control signal. In some examples, this event-control signal can be sent back to the mobile device that originated the sensor data. The event-control signal can cause the mobile device to perform a stated action (e.g. open an application; turn off an application, etc.). In another example, the event-control signal can be sent to another computing device indicated by the original message from the client application and/or associated with the preset trigger event. For example, a user can draw a picture of the word off in red ink. The user can capture a video of his finger touching the word off. This video can be sent by the client device to event-control server 500. Event-control server 500 can match the digital video elements—red letters, text 'off', user finger touching portion of letters—with an event trigger to turn of the user's home smart television. Various data about the user's home smart television (e.g. operating system, command protocols, network address, etc.) can be stored in a database available to event-control server 500. Event-control server 500 can create a command understandable by the smart television to turn off. Event-control server 500 can communicate this command to the smart television. It is noted that if blue ink were used instead of red ink, then event-control server 500 can determine another preset command to provide to a specified computing device associated with said command. In this way, event-control server 500 can provide multiple event commands based on the different detected sensor elements.

Computer vision module 502 can include and/or interact with various computer vision functionalities that can parse and identify various elements of a digital image. For example, computer vision module 502 can include optical character recognition (OCR) module, image recognition applications, and the like. In some embodiments, computer vision module 502 can also include various biometric functionalities for identifying a user in an image or audio file (e.g. voice recognition via microphone data, facial recognition, finger-print recognition, etc.). Computer vision module 502 can include motion analysis algorithms. Computer vision module 502 can receive digital images from an image acquisition source. A digital image can be produced by one or several image sensors, which, besides various types of light-sensitive cameras, can include range sensors, tomography devices, radar, ultra-sonic cameras, etc. Depending on the type of sensor, the resulting image data can be an ordinary 2D image, a 3D volume, or an image sequence. Computer vision module 502 can perform various pre-processing techniques on a digital image. For example, before a computer vision method is be applied to image data in order to extract some specific piece of information, computer vision module 502 can process the data in order to assure that it satisfies certain assumptions implied by the method. Examples can include, inter alia: re-sampling in order to assure that the image coordinate system is correct; noise reduction in order to assure that sensor noise does not introduce false information; contrast enhancement to assure that relevant information can be detected; scale space representation to enhance image structures at locally appropriate scales, etc. Computer vision module 502 can perform various feature extraction processes. For example, image features at various levels of complexity can be extracted from the image data. Typical examples of such features can include, inter alia: lines, edges and ridges; localized interest points such as corners, blobs or points, etc. More complex features may be related to texture, shape or motion. Computer vision module 502 can perform detection/segmentation processes. For example, a decision can be made about which image points or regions of the image are relevant for further processing. Examples can include, inter alia: selection of a specific set of interest points and/or segmentation of one or multiple image regions which contain a specific object of interest. Computer vision module 502 can perform various high-level processing processes as well. These can include, inter alia: verification that the data satisfy model-based and application specific assumptions; estimation of application specific parameters, such as object pose or object size; image recognition; classifying a detected object into different categories; image registration; and/or comparing and combining two different views of the same object. Computer vision module 502 can perform decision making steps as well. This can include, making the final decision required for the application. Example decision types can include, inter alia: pass/fail on automatic inspection applications; match/no-match in recognition applications; flag for further human review in medical, military, security and recognition applications.

Image mapper 504 can map a detected digital image element (and/or other sensor element) with an appropriate event trigger. An event trigger can include a computing device command that is automatically generated, formatted and communicated to the computing device for execution in response to the detection of an associated digital image element (and/or other sensor element). Image mapper 504 can utilize various data structures such as tables and/or indices to map digital image element (and/or other sensor element with appropriate event triggers. Image mapper 504 can access databases such as those of FIG. 4 to perform any process.

Event trigger generator 506 can generate, format and communicate commands (and/or other computing device event triggers) based on the output of image mapper 504. Event trigger generator 506 can generate commands that can be understood by the receiving mobile device's operating system.

Event-control server 500 can maintain one or more client application interfaces (API) 508. Client API 508 can communicate with event-control clients operative in the various client mobile devices. In this way, the various modules of the event-control server 500 can query a client mobile device to obtain additional information about the mobile device (e.g. operating system identifications, verify command executions, determine a mobile device's state (e.g. on, connected to a network, etc.). Client API 508 can receive digital image and/or other sensor data from client mobile devices. Client API 508 can interface with client mobile device to send command to said client mobile devices. It is noted that in some embodiments, the functionalities of event-control server 500 can be performed by an application operating in the mobile device. In still other embodiments, event-control server 500 can be implemented in a cloud-computing environment.

Figure 9A:
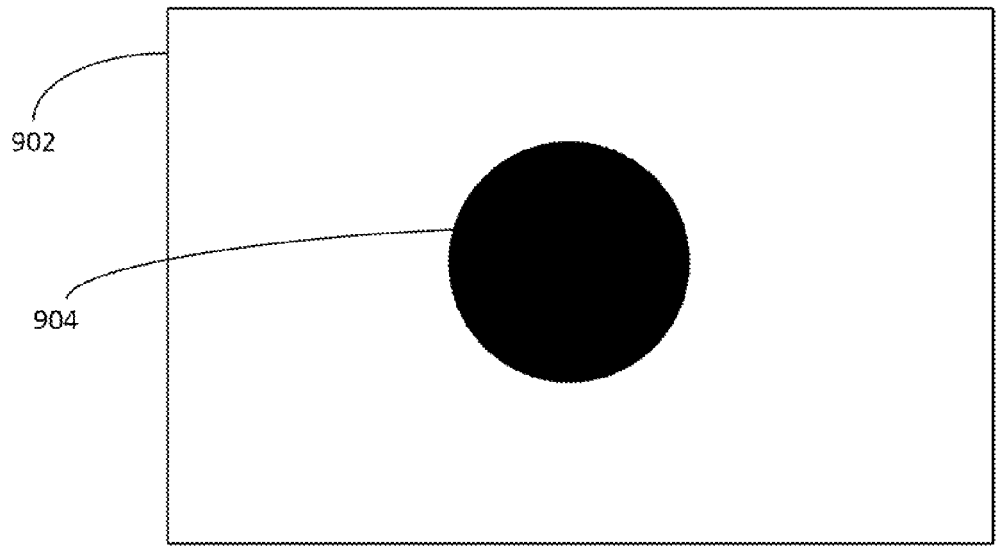
FIGS. 9 A-B illustrate an example of an image with an element added therein and projected for use for a process of mobile device event control with digital images, according to some embodiments.
Figure 9B:
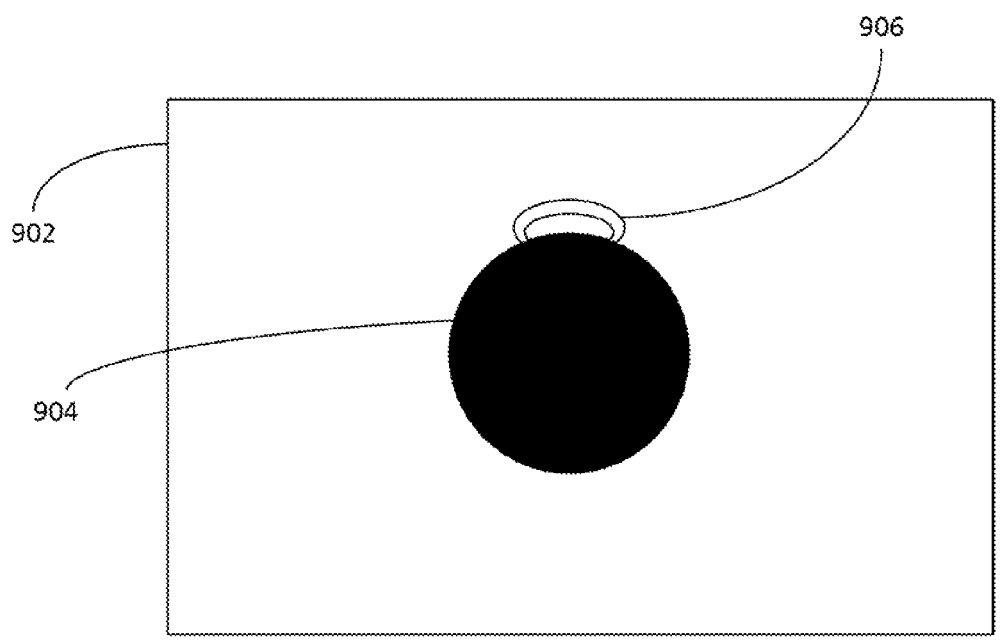

In some embodiments, event-control server 500 can include an image editor 510. Image editor 510 can modify a projected version of an image. Image editor 510 can add and/or remove image attributes to generate the projected version of the image. Image editor 510 can include an automated graphics editing program. Image editor 510 can also include a library of modifications to add to and/or remove from digital images. Image editor 510 can manage the projection of a digital image through a projection device included in and/or coupled with a user's computing device. These modifications can be associated with various functionalities such as operating system commands of the user's computing device. Modifications can also be associated with various user actions. These settings can be preset by the user. For example, the user can select a modification and an associated add-on to include in a projected digital image. In another example, a user can input commands to image editor 510 to reduce a digital image by removing various attributes/characteristics of said image. For example, image editor 510 can remove color, various portions of an image, tone, and noise of an area of the image, etc. A modified image can be projected and utilized as an image of process 100, for example. FIGS. 9 A-B, infra, illustrate an example of an image with an element added therein and projected for use for a process of mobile device event control with digital images. In one example, a user can open a digital image. The user can also open a menu of digital image modifications. The digital image modifications can be graphical elements to add to the digital image. Each graphical element can be associated with an event trigger (e.g. touching a projected image of the add-on will cause the mobile device to perform some specified functionality). The user can then modify the digital image to include one or more graphical elements. The user can then cause a projecting device to project the modified digital image. The user can perform various actions to trigger the specified functionalities. The manner in which the user performs the actions (e.g. height user hold the projector, speed of touch a region of projected image, etc.) can specify various parameters of the specified functionality. For example, the user can touch a projected add-on of a modified digital element that indicates raising the volume of the mobile device's audio system. The user can then bring his hand more proximate to the digital camera of the mobile device. The velocity of the user's hand can be commensurate with the raising of the volume. The user can then, in view of the digital camera, bring his hand less proximate to the digital camera. The velocity of the user's hand can be commensurate with the lowering of the volume.

Figure 6:
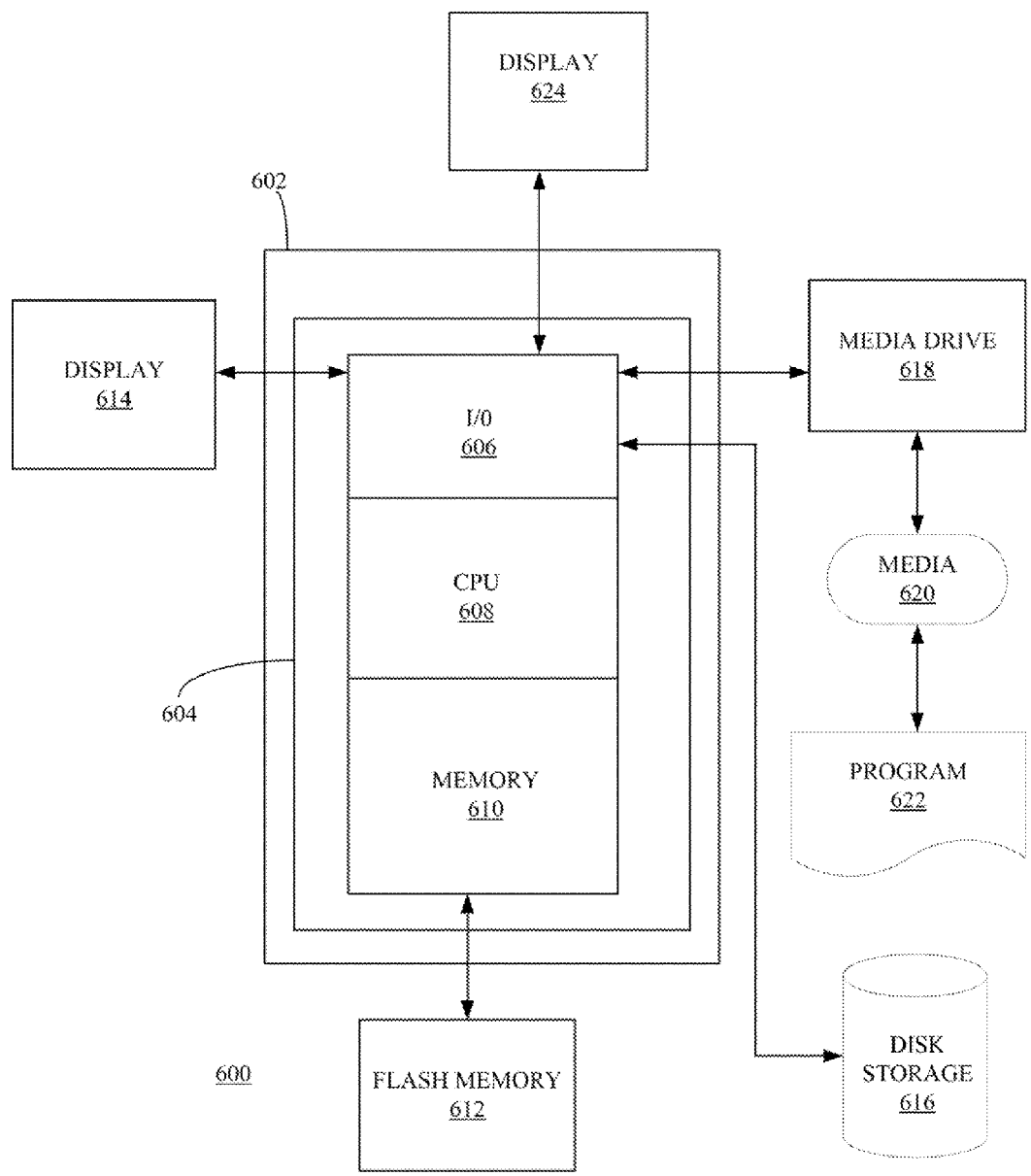
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include various sensors such as digital cameras, video recorder modules, microphones, and the like. Moreover, it is noted that computing system 600 can be configured to include additional systems in order to fulfill various functionalities. In this way, computing system 600 can be configured as a mobile device and include such systems as may be typically included in a mobile device such as GPS systems, gyroscope, accelerometers, cameras, etc. In some embodiments, system 600 can include and/or be coupled with an image projector (not shown) is an optical device that projects an image (or moving images) onto a surface.

Figure 7:
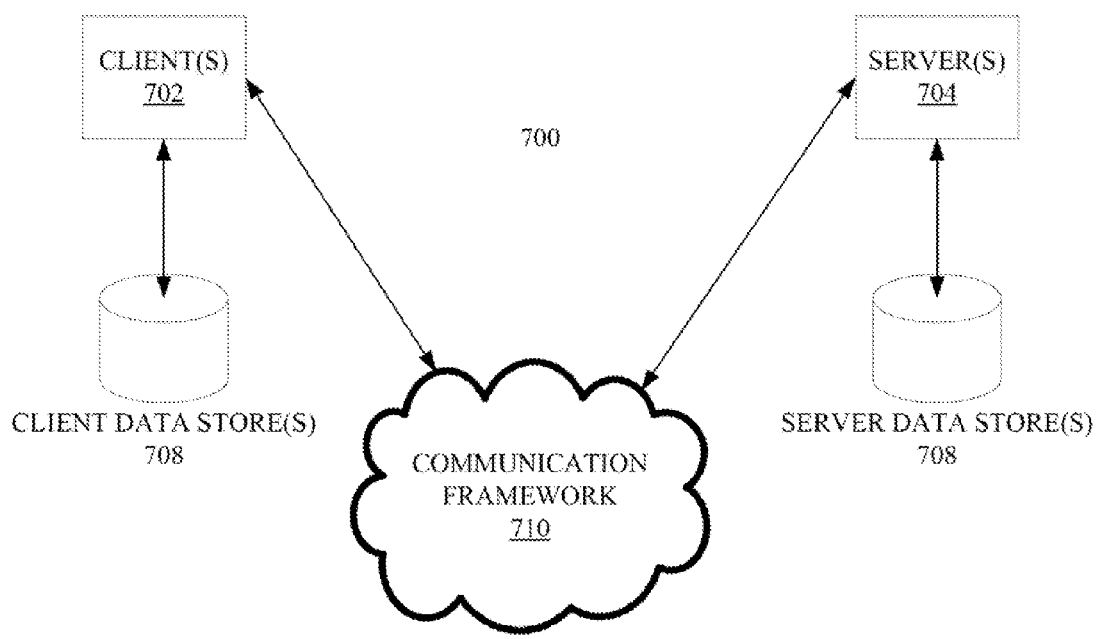
FIG. 7 illustrates a sample computing environment which can be utilized in some embodiments.

FIG. 7 illustrates a sample computing environment 700 which can be utilized in some embodiments. The system 700 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 may be in the form of a data packet adapted to be transmitted between two or more computer processes. The system 700 includes a communication framework 710 that can be employed to facilitate communications between the client(s) 702 and the server(s) 704. The client(s) 702 are connected to one or more client data store(s) 706 that can be employed to store information local to the client(s) 702. Similarly, the server(s) 704 are connected to one or more server data store(s) 708 that can be employed to store information local to the server(s) 704.

Exemplary Use Cases

Figure 8A:
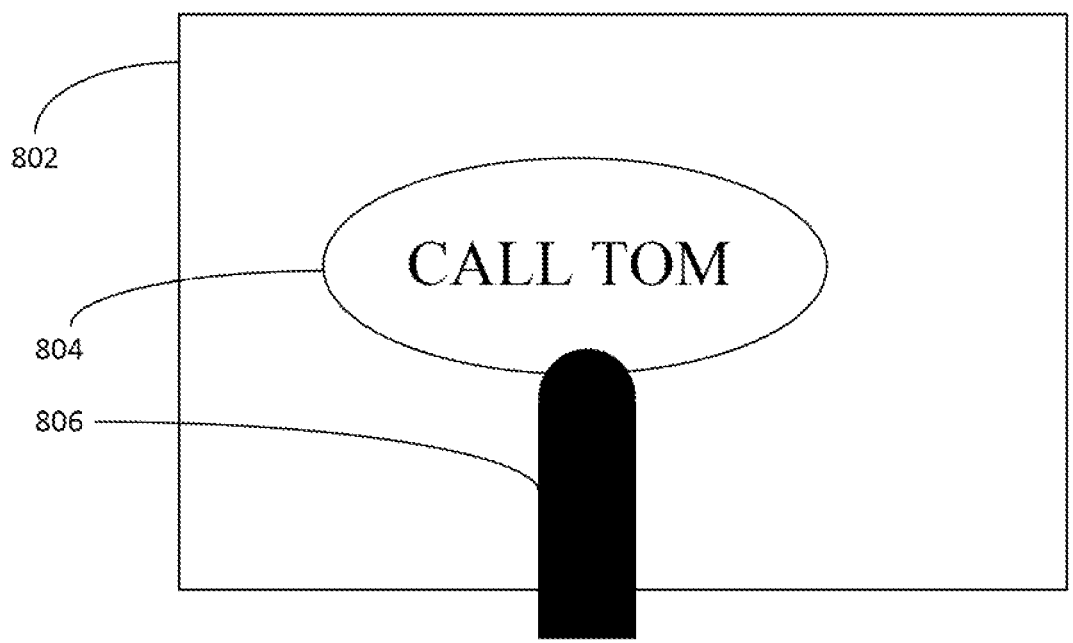
FIG. 8 A-B, illustrates an example use case of mobile device event control with a user-created digital image, according to some embodiments.
Figure 8B:
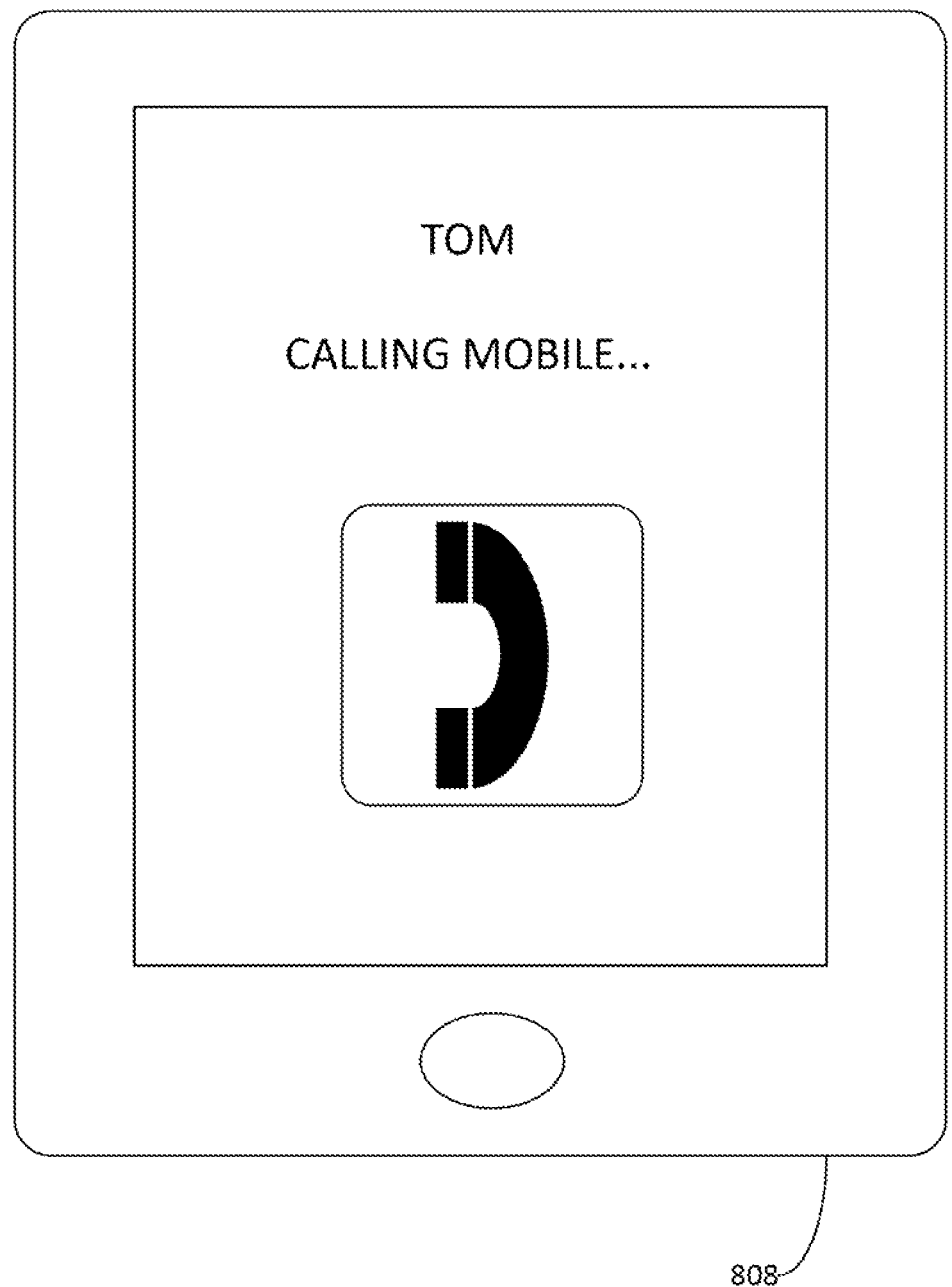

FIG. 8 A-B, illustrates an example use case of mobile device event control with a user-created digital image, according to some embodiments. On a sheet of paper 802, a user has written the text 'call Tom' in an ellipsoid 804. The user then places his finger 806 within ellipsoid 804. The user captures a digital image of this event. In this way, the user has created a custom command button. This digital image is uploaded to an event-control server such as those described in FIGS. 4-5. Event-control server interprets the text in the ellipsoid to be text of interest. For example, the user may have pre-designated ellipsoid shapes to include text of interest with the event-control server. The user can interpret the text to determine a meaning of the term and/or other methodology (e.g. using a digital dictionary, a table that links terms to operating system and/or application functionalities, etc.). In this example, the term 'call' can be interpreted to initiate the mobile phone application in the mobile device and dial a contact's telephone number. The contact can be identified by the word 'Tom'. The event-control server then generates a series of operating system commands and communicates them to the operating system of the user's mobile device (e.g. via a client application). The mobile device can then open the mobile phone application and dial contact—'Tom' 808. In some embodiments, a mobile device application can perform the event-control server operations described with reference to FIGS. 8 A-B.

In one example, a user can write a webpage uniform resource locator (URL) on a sheet of paper. The user can capture a video of the user 'pushing' the webpage URL. The video can be interpreted as a user initiating a command to the mobile device's web browser application to navigate to the webpage. The web browser can then access the specified webpage.

In another example, the user can capture an image of a surfer riding a wave in the ocean (e.g. from a surf magazine). The user can point to the element in the image that depicts a surfboard and take a digital image thereof. The digital image can be uploaded to an application that identifies the surfboard and the pointing (e.g. with a finger, with a pen, with a pencil, etc.). The application can interpret these image elements as a command to generate a command to perform an Internet image search for surf board. Attributes of the surf board can be obtained through image analysis algorithms (e.g. color, brand, type (e.g. short or long), etc.). These attributes can be included in the image search. In some embodiments, the type of pointing device can signify the search parameters. For example, a human finger can be preset to indicate a search for the highest level of the indicated image element (e.g. 'surf board'). A pen and/or pencil can indicate to identify various attributes of the indicated image element and include said attributes in the image search query. These parameters can be preset by a user via an application interface.

In yet another example, the mobile device can include a graphics editing program (e.g. a smart phone photo editing application). The user can select portions of a digital image and manipulate said portions. Manipulations can include increase/decreasing size, color manipulation, cut and pasting of various digital image elements, inclusion of other digital image elements on image portion etc. The manipulated image can then be uploaded to the event-control server (and/or mobile device application) for parsing, analysis, etc. It is noted that the graphics editing program can include a functionality to include a kinetic aspect to the manipulated image (e.g. spinning the manipulated image about an axis). The kinetic aspect can be interpreted as an attributed of the image by an event-control. For example, a table can match a spinning motion with key search term 'motion'. This term can be included in a search engine query constructed from decomposition of an image submitted as an image query via mobile device event control with a user-created digital image process.

A user can select regions of a digital image that correspond a specified user action to a certain control. For example, touching only the upper portion of an image element to trigger a command to be generated.

Other types of user behaviors can also be associated with various controls. For example, a digital camera can obtain depth perception (and/or other spatial) information about a user action. For example, user actions can be analyzed using their topological, geometric, or geographic properties (e.g. in three dimensional space). In one example, a user's finger can come in and out of focus over a particular projected image. Various attributes of the user action in space can be parsed, interpreted and/or analyzed. Example spatial motion attributes include, inter alia: speed of motion of the user's finger, the number of times the user repeats the motion, the directions of the motions (e.g. user draws a counter clockwise circle versus a clockwise circle halfway between the digital camera and the 'screen' of the projected image), etc. Spatial motion attributes can be associated with parameters of the various controls.

Additionally, a projected image can include added characteristics not included in the original version of the digital image. FIGS. 9 A-B illustrate an example of an image with an element added therein and projected for use for a process of mobile device event control with digital images, according to some embodiments. The added characteristic can be included into the original digital image (e.g. with an automated graphics editing program). Digital image 902 includes element 904. Element 904 is modified to include add-on 906. In this particular example, add-on 906 can be associated with an event trigger. The command associated with the event trigger can be metaphorically related to a symbolic meaning of add-on 906. For example, add-on 906 can be a handle. A mobile device can be used to project modified digital image 902 (with add-on 906) onto wall, white paper, etc. A user can tap the projection of add-on 906. A digital camera in the mobile device can record the user's action as a video file. In this way, an event trigger to implement a command to perform some action with the mobile device's operating system can be invoked. For example, the handle add-on can represent the command to transport a local file to a web-based file hosting service. In other examples, a filter can be utilized to remove certain attributes to generate a reduced projected image. Images can be reduced and then also receive add-on elements for projection. It is noted that in some examples, the higher a user holds a mobile device with a projector, the larger the 'screen' area that can be employed to project digital images associated with various event triggers and/or subsequent operating system and/or server-side commands. More than one digital image associated with an event trigger can be projected at a time.

In yet another example, the mobile device can include an augmented reality system. The augmented reality system can provide a 'live', direct and/or indirect, view of a physical, real-world environment (e.g. as captured by a digital camera system in the mobile device) whose elements are augmented by computer-generated sensory input such as, inter alia, sound, video, graphics and/or GPS data. For example, the display can provide a digital image of a user-created image that includes elements associated with various event trigger. These elements can be recognized by a system in the mobile device and/or server (e.g. server 500) and displayed with augmented reality labels on the mobile device display. Additionally, an event can be triggered by some defined user action such as gestures by touching the screen with one or more fingers and/or performing some action with the one or more fingers (or hands in some examples) after the touch. Elements of the digital image associated with the user action (e.g. fingers, hands, the sheet of paper, etc.) can also be labeled with augmented reality text and/or icons. For example, a user can draw various audio control input labels (e.g. 'volume', 'bass', 'treble') on a sheet of paper. Each audio control input label can be associated with an audio-related operating system command such as: 'volume'—volume control, 'bass'—bass control, 'treble'—treble control. The mobile device camera can be aimed at the sheet of paper. A user action can be defined for each audio control input label (e.g. touching the text of the audio label can toggle the particular audio-related operating system command). Additional user actions can be associated with various values of the audio-related operating system command. For example, touch a finger to the 'volume' text can toggle the mobile device's volume control. Modulating the position of the finger in three-dimensional space in various patterns can then control the volume values. For example, bringing the finger closer to the mobile device's camera can increase the volume value. Likewise, taking the finger farther away relative to the mobile device's camera can decrease the volume value. In another example, rotating the finger in one direction can increase the volume value and rotating the finger in another direction can decrease the value. Other commands can be implemented by finger movement. For example, drawing a shape such as triangle can turn off the mobile device's volume control. Drawing a square with the finger can be used toggle through other available mobile device's controls. Flicking a finger can be used to scroll through a list of augmented reality control elements that display available mobile device's controls. Moreover, mobile device's control values can be graphically displayed with the mobile device's display with augmented reality elements. These augmented reality elements can be overlapped or otherwise visually associated with the current active user body-part (e.g. the finger being monitored by the system for cues as to how to modify the current mobile device's control). In one example, a brightness level and/or color of the finger (e.g. as an augmented reality element overlapping said finger) can be set commiserate with the current volume value. Additionally, more than one mobile device control can be activated at the same time. For example, a finger in the user's left hand can be used to control volume as a function of distance from the mobile device's camera while a finger in the right hand can be used to control treble as a function of rotation of the finger. In some examples, the functionality of image editor 510 can be adapted to include an augmented-reality module that provides and manages said augmented-reality elements accordingly. A user can preset the various augmented-realty functionalities. For example, image editor 510 can provide a dashboard that a user can use to preset augmented-reality options.

In still yet another example, more than one user can utilize the idea without the need to see the mobile device display. For example, several shapes corresponding to sounds for the audio system of the mobile device to generate (e.g. with a software synthesizer program, softsynth application, etc.). The subsets of shapes could correspond to various digitally replicated instrument sounds. A first user could 'play' the first subset of shapes; a second user could play the second subset of shapes; etc. In this example, each user could rely on audio cues and viewing the mobile device display can be optional. In some embodiments, the physically drawn 'buttons' need not be displayed with the mobile device display in order to be utilized (e.g. as long as they are viewable by the mobile device's camera system). In some embodiments, a physically drawn 'button' can be obscured (e.g. by an augmented-reality element, or not incorporated by the GUI).

In some embodiments, a website can include image elements used for implementation of various processes and use cases described herein. In this context, these image elements can be labeled as 'manipulations'. Manipulation information (e.g. image elements, frequency of use, user feedback, and the like) can be obtained and stored by a server (e.g. event-control server 406). Various specified metrics can be used to rank manipulations. Certain manipulations can be determined to be useful. These useful manipulations can be compared among several websites. Useful manipulations can be adapted to a current website due to various cross comparisons among one manipulation versus another across other several third party websites (e.g. prior websites that were manipulated). The comparison of the current website with prior third party manipulations can include common functions that can be assigned to a known manipulation. Moreover, in some examples, the idea of having the experience of manipulations exchange used data with each other. For example, they can share which approach is useful and/or helpful in a specific case. A user can view a website, try to manipulate with a current manipulation schematic. If the user does not find the current manipulation schematic helpful, the user can access one or more other similar website's usefully ranked manipulations and import them to the user interface (e.g. with a specialized web browser plugin). This event can be recorded and an available to other users of the website. For example, a third user can utilize the first website and utilize both some aspect of the original manipulation some aspect of the imported manipulation. A record of the third user's use of both native and imported manipulations can be recorded by the system as well.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are

What is claimed as new and desired to be protected by Letters Patent of the United States is:

1. A server system for mobile device event control with digital images comprising:
   a processor configured to execute instructions;
   a memory containing instructions when executed on the processor, causes the processor to perform operations that: receiving a digital image from a mobile device;
   identifying a first element of the digital image and a second element of the digital image, wherein the first element of the digital image comprises a user-selected content, and wherein the second element comprises a depiction of a user action;
   determining an event trigger identified by the first element and the second element, wherein the event trigger comprises a mobile device operating system command, and wherein the mobile device operating system command comprises a command, to execute an image search with an online image search engine accessed by a web browser operating in the mobile device;
   generating a mobile device command according to the event trigger;
   communicating the mobile device command to a mobile operating system; decomposing the first element into a set of attributes with an object recognition functionality operating in at least one computer processor;
   matching an attribute of the set of attributes with a term;
   composing a search query of the image search with the term derived from the set of attribute of the first element;
   projecting the digital image with a projecting device onto a flat surface;
   displaying the digital image on a display of the mobile device,
   wherein a user interface on the display of the mobile device enables the user to manipulate the digital image according to the user action, wherein the user action comprises multi-touch user gestures,
   wherein the user interface on the display of the mobile device enables the user to assign a kinetic motion attribute to the digital image according to the multi-touch user gestures, and
   wherein the kinetic motion attribute comprises a spinning of the digital image around a user designated axis.

2. The server system of claim 1, wherein the server system comprises a graphics editing application available to the user via a web page dashboard.

3. The server system of claim 1, wherein the user-selected content comprises a digital photograph of a physically published image.

* * * * *